US010798446B2

(12) United States Patent
Delaney et al.

(10) Patent No.: US 10,798,446 B2
(45) Date of Patent: Oct. 6, 2020

(54) CONTENT NARROWING OF A LIVE FEED BASED ON COGNITIVE PROFILING

(71) Applicant: International Business Machines Corporation, Armonk, NY (US)

(72) Inventors: Mark Delaney, Raleigh, NC (US); Robert Grant, Atlanta, GA (US); Trudy L. Hewitt, Cary, NC (US); Jonathan Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 15/862,435

(22) Filed: Jan. 4, 2018

(65) Prior Publication Data

US 2019/0208264 A1 Jul. 4, 2019

(51) Int. Cl.
*H04N 21/44* (2011.01)
*H04N 21/2187* (2011.01)
*G06F 16/48* (2019.01)
*G06F 16/435* (2019.01)
*G06F 16/735* (2019.01)

(52) U.S. Cl.
CPC ..... *H04N 21/44008* (2013.01); *G06F 16/435* (2019.01); *G06F 16/48* (2019.01); *G06F 16/735* (2019.01); *H04N 21/2187* (2013.01)

(58) Field of Classification Search
CPC .............................. H04N 21/44008
USPC .................................................. 725/9
See application file for complete search history.

(56) References Cited

U.S. PATENT DOCUMENTS

| 8,086,491 B1* | 12/2011 | Matz ............... G06Q 30/02 705/14.49 |
| 8,776,149 B1* | 7/2014 | Koch ............... H04N 21/4334 725/37 |
| 8,782,701 B2* | 7/2014 | Yu ............... H04N 5/44543 725/39 |
| 2005/0033657 A1 | 2/2005 | Herrington et al. |
| 2014/0149555 A1* | 5/2014 | Bank ............... H04L 65/602 709/219 |

(Continued)

OTHER PUBLICATIONS

National Institute of Standards and Technology; The NIST Definition of Cloud Computing; Special Publication 800-145; Dec. 13, 2016; pp. M-7 to M-13.

*Primary Examiner* — Nasser M Goodarzi
*Assistant Examiner* — Jaycee Imperial
(74) *Attorney, Agent, or Firm* — Michael O'Keefe (57) ABSTRACT

Methods and systems for use in processing streaming video content to determine portions of interest to a viewer and arrange content display accordingly. In various examples, a streaming video processing system determines a plurality of media content tags associated with streaming video content, including a first tag associated with a stored portion of the streaming video content and a second tag associated with a current portion of the streaming video content. The system calculates a first interest correlation value based on the first tag and a cognitive profile associated with a content requestor, and a second interest correlation value based on the second tag and the cognitive profile. When the first interest correlation value indicates a greater interest level than the second interest correlation value, the system facilitates display of the stored portion of the streaming video content prior to display of the current portion of the streaming video content.

20 Claims, 8 Drawing Sheets

(56) References Cited

U.S. PATENT DOCUMENTS

| | | | |
|---|---|---|---|
| 2015/0110462 A1* | 4/2015 | Maisenbacher | G11B 27/105 386/230 |
| 2015/0365725 A1 | 12/2015 | Belyaev et al. | |
| 2016/0041998 A1 | 2/2016 | Hall et al. | |
| 2016/0372139 A1* | 12/2016 | Cho | G06F 17/30 |
| 2016/0381405 A1* | 12/2016 | Smith | H04N 21/2541 725/28 |
| 2018/0144052 A1* | 5/2018 | Sayyadi-Harikandehei | G06F 17/30867 |
| 2019/0075367 A1* | 3/2019 | van Zessen | H04N 21/26258 |

* cited by examiner

CONTENT NARROWING OF A LIVE FEED BASED ON COGNITIVE PROFILING

BACKGROUND

This invention relates generally to computer networks, and more specifically, to identifying and prioritizing portions of interest of streaming video content.

Consumers currently have many options for receiving and sharing digital media such as video. For example, live streaming platforms and applications are available that allow to users to broadcast or multicast live video content (e.g., webinars, product demonstrations, news, music, sporting events, etc.) using a camera, web camera or smart phone. Viewers can receive such content via the internet for display on a computer, television, tablet, or other personal device through a website or installed application.

Streaming multimedia, such as live streaming video from a live feed, generally refers to multimedia that is constantly received by and presented to an end-user while being delivered by a content source. Streaming refers to the process or method of providing or delivering multimedia in this manner. Live streaming typically refers to internet content that is delivered in real-time as events happen. Live streaming usually requires a form of source media capture (such as a video camera or screen capture software), an encoder to digitize the content, a media "publisher", and a content delivery network for distributing and delivering the media content. A client device with media player capabilities can be used to begin playback of such media content before the entire media content file is received.

SUMMARY

Embodiments of the present invention disclose a computer-implemented method, a system, and a computer program product for determining portions of streaming video content which are of likely interest to a recipient, and prioritizing display of such portions. A client device request is received for available streaming video content for presentation on a display associated with the client device. A plurality of media content tags associated with the streaming video content are determined, the plurality of media content tags including a first media content tag associated with a stored portion of the streaming video content and a second media content tag associated with a current portion of the streaming video content. A cognitive profile associated with a user of the client device is retrieved from a database. Based on the first media content tag and the cognitive profile, a first interest correlation value is calculated. In addition, based on the second media content tag and the cognitive profile, a second interest correlation value is calculated. When the first interest correlation value indicates a greater interest level than the second interest correlation value, display of the stored portion of the streaming video content on the display device is prioritized over the display of the current portion of the streaming video content. Display of a current portion may subsequently be prioritized based on an updated interest correlation value.

DETAILED DESCRIPTION

When viewing live streaming video content within a platform such as a social networking platform, viewers often watch the entire video, switch to other activities when the streaming video content becomes boring, or move around within the video in hopes of finding something of interest. The novel methods and systems described below provide techniques for personalizing and prioritizing display of portions of streaming media content, based on media content tags and cognitive profile information, such that viewer interest is more readily established and maintained.

In accordance with at least one embodiment of the invention, for example, a streaming video processing system receives a request from a client device to join a live video stream in progress. Based on media content tags and cognitive profile information of the requestor, the streaming video processing system identifies one or more earlier portions of the video stream that are likely to be of interest to the requestor. The requestor is then presented with an option to view such stored portions (or "highlights") of the video stream. In response to receiving an affirmative reply, the streaming video processing system presents a "highlight reel" that includes the stored portions of the video stream of likely interest to the requestor. Following presentation of the highlight reel, the client device is then joined to the live video stream.

Figure 1:
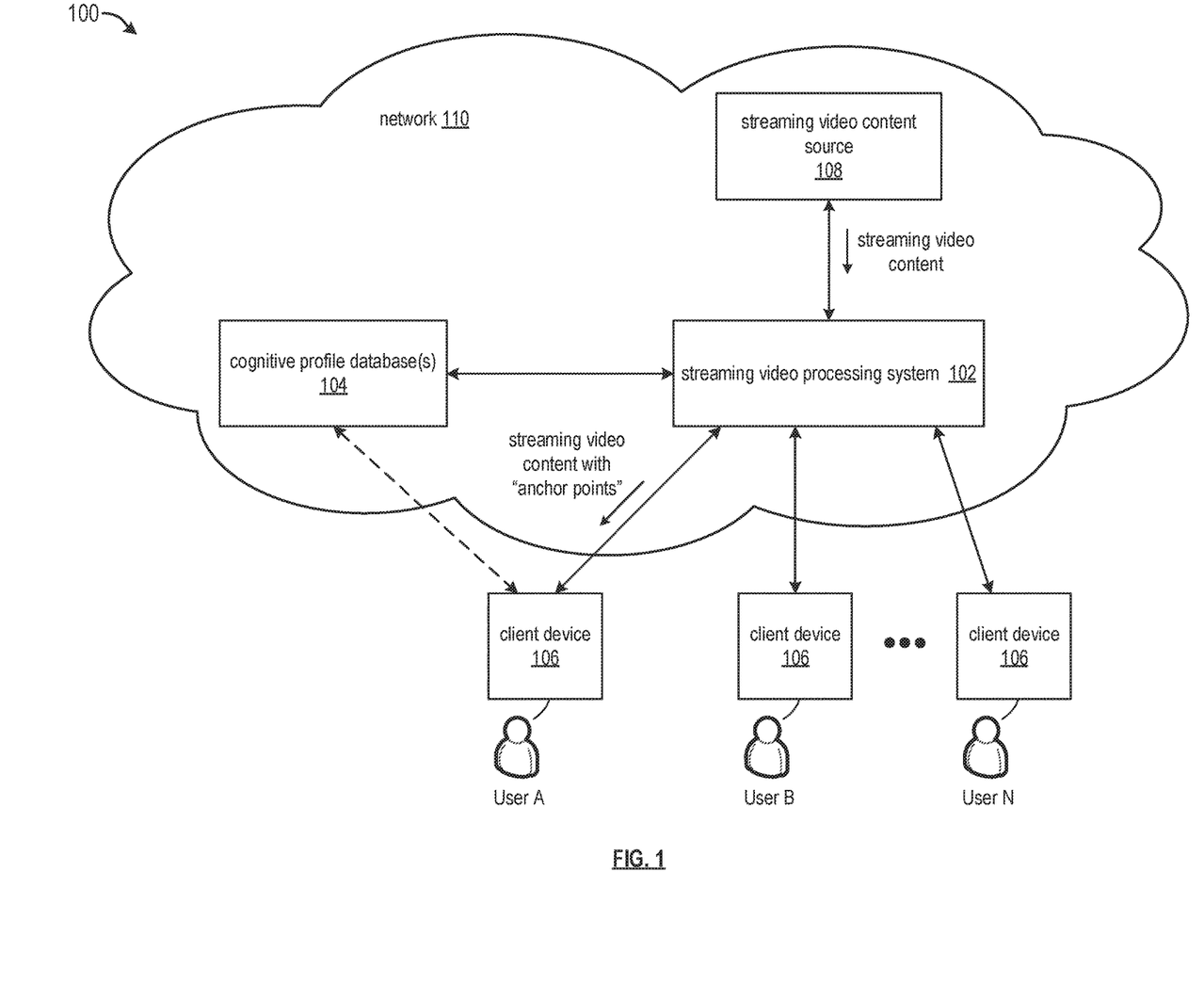
FIG. 1 is a schematic block diagram of an example of a streaming video platform in accordance with an embodiment of the present disclosure.

Referring now to FIG. 1, a schematic block diagram of an example of a streaming video platform 100 in accordance with an embodiment of the present disclosure is shown. The illustrated streaming video processing system includes a streaming video processing system 102, a cognitive profile database(s) 104, a plurality of client devices 106 associated with a plurality of users A-N, and a streaming video content source 108. The components of the streaming video platform 100 are coupled via a network 110, which may include one or more wireless and/or wire lined communication systems; one or more non-public intranet systems and/or public internet systems; and/or one or more local area networks (LAN) and/or wide area networks (WAN).

Figure 7:
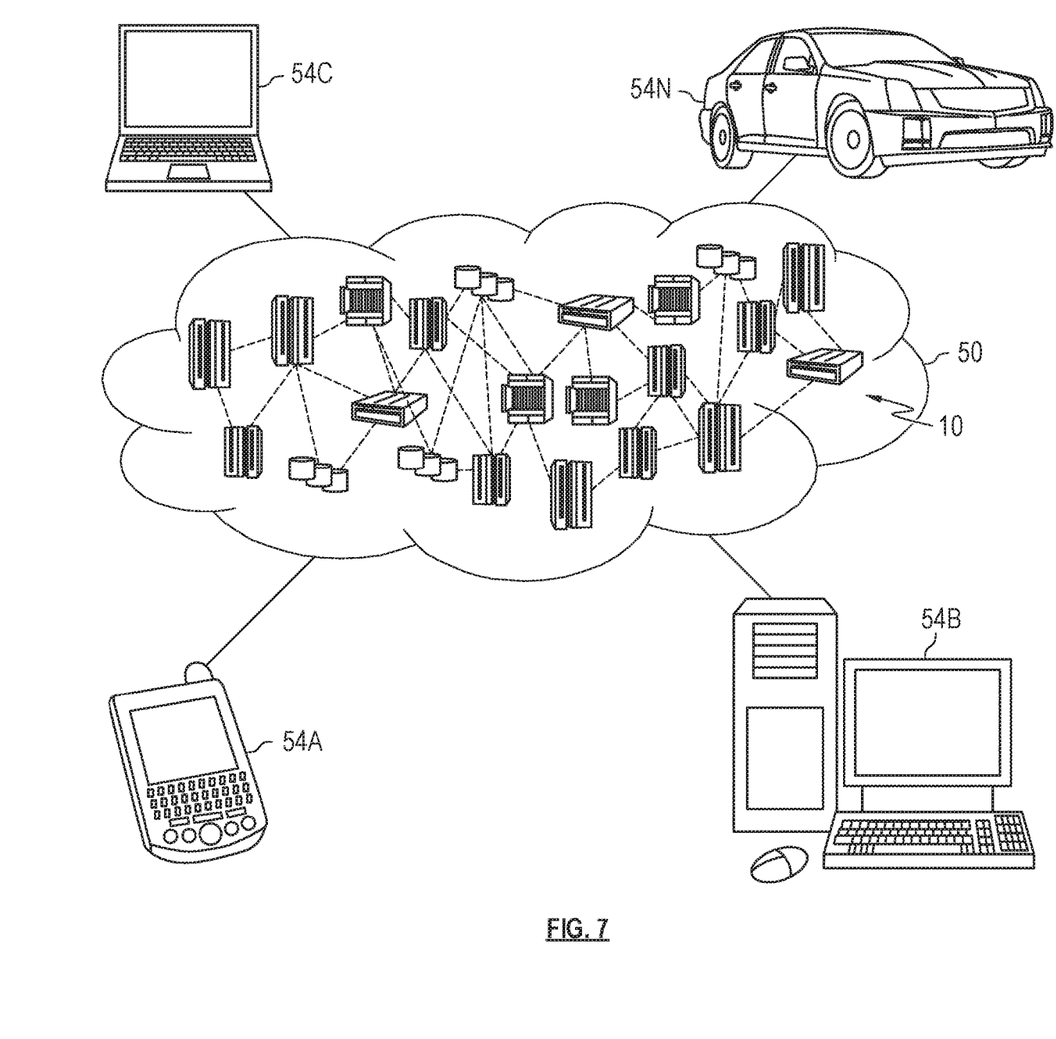
FIG. 7 depicts a cloud computing environment according to various embodiments of the present disclosure.
Figure 8:
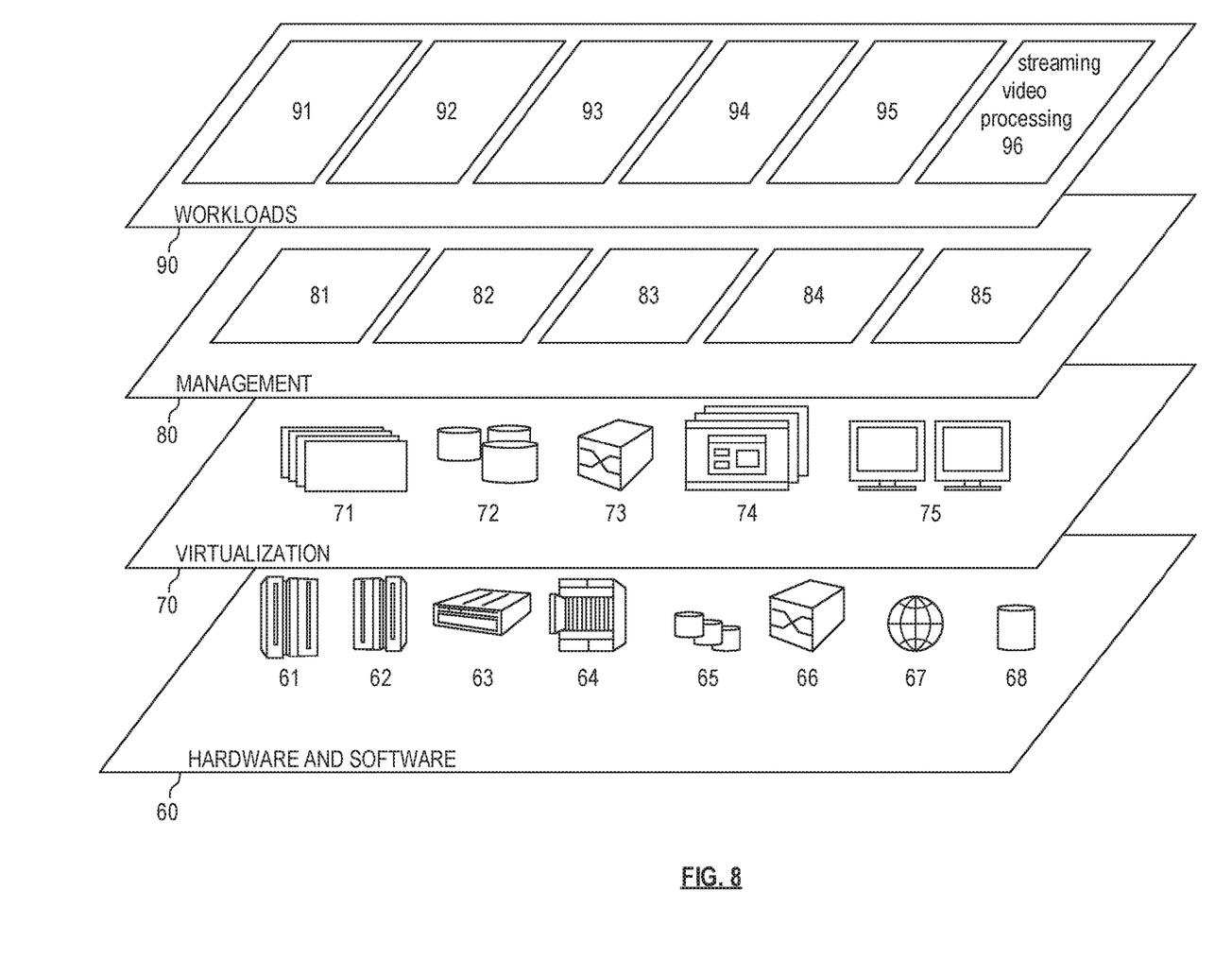
FIG. 8 depicts abstraction model layers according to various embodiments of the present disclosure.

In some embodiments, network 110 can be implemented by utilizing the cloud computing environment 50 of FIG. 7, for example, by utilizing the streaming video processing 96 of the workloads layer 90 of FIG. 8 to perform streaming video processing in the network. The streaming video processing system 102 and cognitive profile database(s) 104 can be implemented by utilizing one or more nodes 10 of a cloud computing environment 50 of FIG. 7.

In accordance with various embodiments of the invention, client devices 106 may each be a portable computing device or a fixed computing device. Examples of a portable computing device include a social networking device, a gaming device, a smart phone, a digital assistant, a digital video player, a laptop computer, a handheld computer, a tablet device, and/or any other portable device that includes a computing core and integrated or attached video display capabilities. Examples of a fixed computing device include a desktop computer, a computer server, a cable set-top box, a satellite receiver, a television set, home entertainment equipment, a video game console, and/or any type of home or office computing equipment with integrated or connected video display capabilities.

In accordance with an embodiment of the invention, each client device 106 includes software and hardware to support one or more communication links with the network 110. For example, a client device 106 can include an interface that supports a communication link (e.g., wired, wireless, direct, via a LAN, via the network 110, etc.) with the streaming video processing system 102. As another example, a client device 106 interface can support communication links (e.g., a wired connection, a wireless connection, a LAN connection, and/or any other type of connection to/from the network 110) with one or more systems that generate and/or maintain the cognitive profile database(s) 104. In certain embodiments, the cognitive profile database(s) 104 may be fully or partially supported, maintained or curated by the streaming video processing system 102.

As described more fully below, the streaming video processing system 102 generally operates to receive requests, from client devices 106, for the streaming video content from one or more streaming video content sources 108. Such requests may be generated, for example, automatically (e.g., upon opening a social media application on a client device 106) or based on user input to a client device 106 (e.g., selection of a link). Upon receiving a request, the streaming video processing system correlates a cognitive profile of a viewer against media content tags associated with the requested streaming video content to identify portions of likely interest to the viewer. Such portions of the streaming video content (which may be referred to herein as "anchor points", highlight segments, or like terminology) may then be displayed in lieu of or prior to display of a current/live portion of the streaming video content. A cognitive profile associated with a user of a client device 106 can include one or more characteristics such as demographic information (age, gender, location, etc.), social media activity related information (e.g., check-ins, "likes", "follows"), browsing history information, information derived from on-line forms and surveys, etc. The cognitive profile may be accessed and updated in real time.

Figure 2:
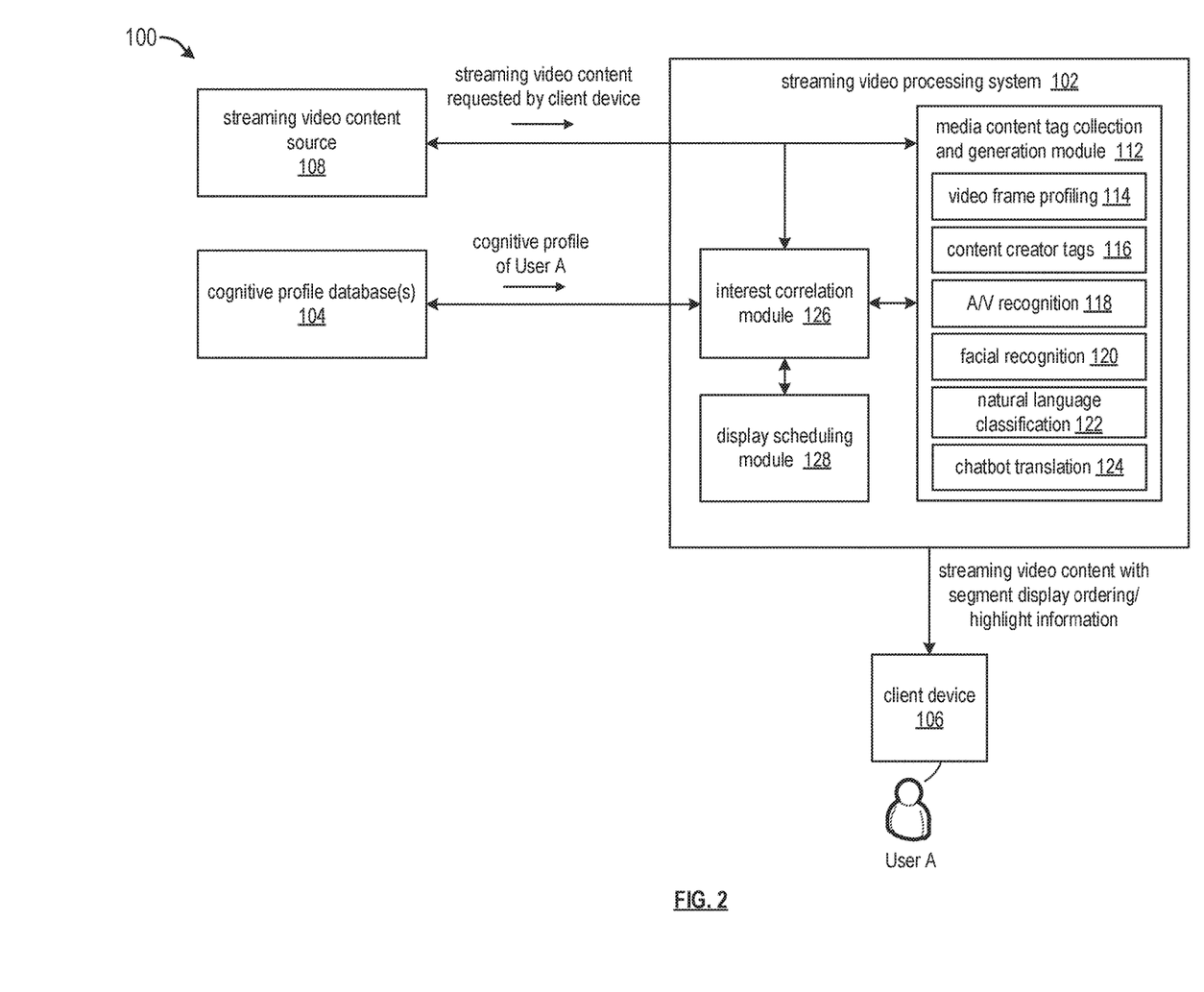
FIG. 2 is a schematic block diagram of another example of a streaming video platform in accordance with an embodiment of the present disclosure.

FIG. 2 is a schematic block diagram of another example of a streaming video platform 100 that includes the streaming video processing system 102, cognitive profile database(s) 104, a client device 106, and streaming video content source of FIG. 1. In the illustrated example, the streaming video processing system 102 includes a media content tag collection and generation module 112 for determining media content tags associated with streaming video content received from the streaming video content source 108 and delivered (e.g., with segment display ordering information and/or highlight identification information) to the client device 106 for display to User A. The media content tag collection and generation module 112 of this example includes video frame profiling capabilities 114 (e.g., for generating media content tags in real time based on, for example, I-frame information of the streaming video content), content creator tags 116, audio/video recognition capabilities 118, facial recognition capabilities 120, natural language classification capabilities 122, and chatbot translation capabilities 124. In general, media content tagging includes associating descriptive information with the content of video (e.g., frames, scenes or shots) in an easily extractable manner, rather than associating information with the whole streaming video content.

Media content tags generated by the media content tag collection and generation module 112 are provided to an interest correlation module 126, which also retrieves cognitive profile information relating to a recipient (e.g., User A and/or client device 106) for use in identifying portions of the streaming video content that are likely to be of relatively high interest to the recipient. In one embodiment, the interest correlation module 126 operates as follows:

1) Media content tags associated with a portion of the streaming video content are represented by a variable (S), ongoing analysis of current or real time point in the streaming video content is represented by the variable (P), and a viewer interest analysis is represented by the variable (U).

2) An interest correlation value of U in relation to S is estimated as f(j)=(S*U). An interest correlation value of U in relation to P is also estimated as f(h)=(S*P).

3) Portions or segments of streaming video content are identified for prioritized display when a corresponding value (J) is greater than a present value of (H). All portions or segments for which this is true are classified as "highlight" segments for purposes of prioritized display.

4) Any number of highlight segments can be displayed in a prioritized manner so long as (ongoing real time analysis*viewer interest analysis)<(media content tags*viewer interest analysis)n. This can be represented as Ht>Jn (play streaming media content in real time) and Ht<Jn (play highlight segments).

The display scheduling module 128 operates to generate display control or scheduling information for use by the client device 106 in ordering the display of segments of the streaming video content based on the calculations performed by the interest correlation module 126. Although not separately illustrated, the streaming video processing system 102 may further include a transcoding module, content storage/queuing capabilities, a security/authentication module, etc.

In one example, the cognitive profile database 104 is curated separately from the streaming video processing system 102. In other examples, the streaming video processing system 102 may maintain an internal cognitive profile database, or supplement an internal cognitive profile database with cognitive profile information from a separate cognitive profile database 104. Cognitive profile information for users of the streaming video processing system 102 may be updated on a periodic basis, on a scheduled basis, in real time, on demand, etc.

In one example of operation, a user of client device 106 ("Lizz") is subscribed to a service that provides monthly samples of products for evaluation. The subscription service also provides a live video feed of product demonstrations. Lizz has not been viewing the live video feed because she is only interest in product 1, and the reviewers have recently been discussing product 2. For example, the live video stream may begin with a discussion of product 2, followed by a discussion of product 1, another discussion of product 2, and then other topics. By the time Lizz opens the live video stream, the reviewers are discussing product 3. The streaming video processing system 102 detects that Lizz has a high interest in product 1 (higher than product 3), and the stored (or buffered) section of the live video stream discussing product 1 is therefore displayed to Lizz before she is brought to a current section of the live video stream.

Figure 3:
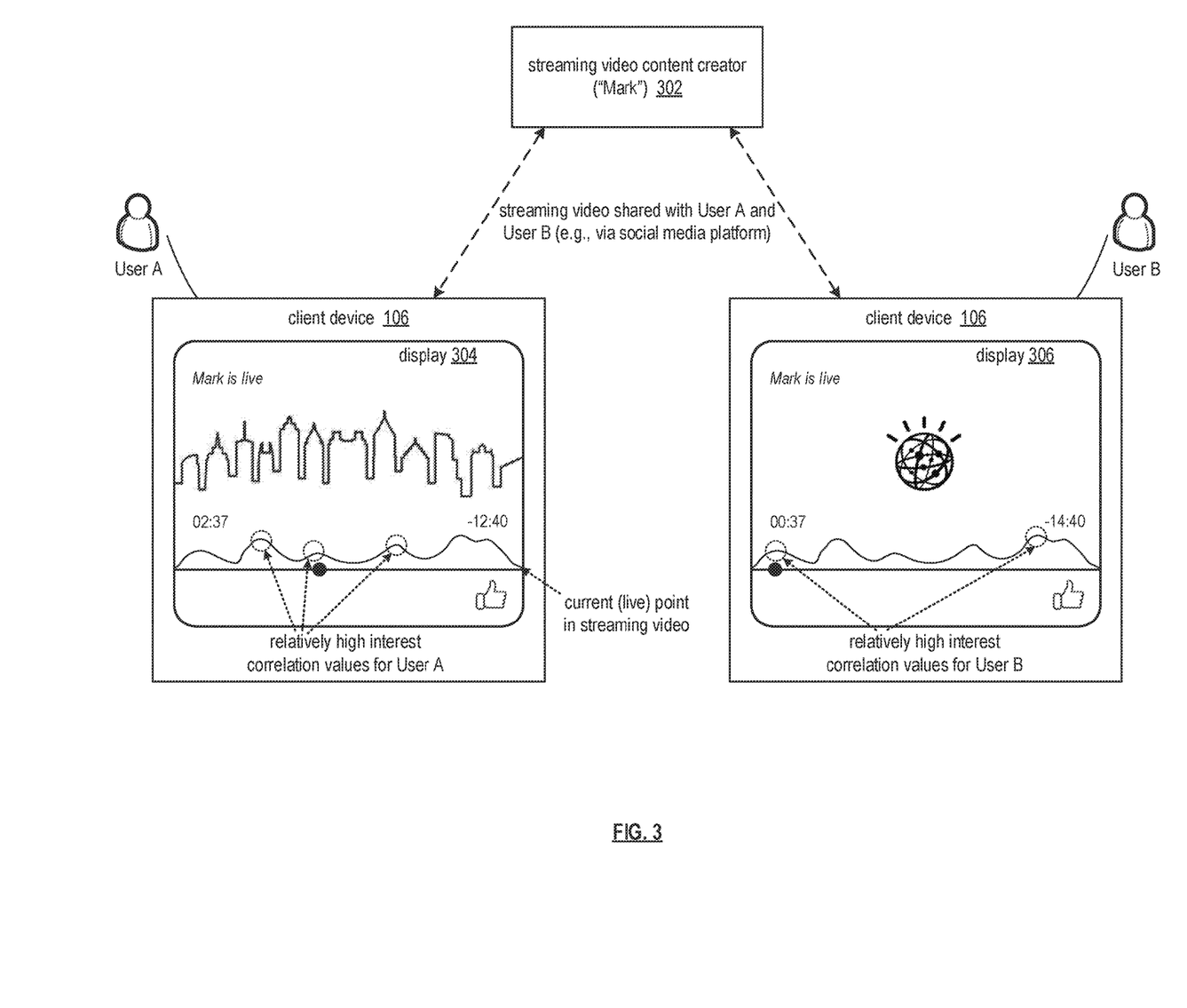
FIG. 3 is a schematic block diagram of a specific example of a streaming video processing in accordance with an embodiment of the present disclosure.

FIG. 3 is a schematic block diagram of a specific example of a streaming video processing in accordance with an embodiment of the present disclosure. The illustrated example includes a streaming video content creator ("Mark") 302 sharing streaming video content with User A and User B via client devices 106 and a streaming video processing system 102 (not separately illustrated). The client device 106 of User A includes a display 304 and the client device 106 of User B includes a display 306. The displays 304 and 306 can be integral with or otherwise associated with a respective client device 106, and can be implemented, for example, by utilizing the display screen 620 of FIG. 6. A user interface and viewing application can be displayed in conjunction with a web browser associated with the streaming video platform 100, and/or can be displayed in conjunction with an application stored in a memory of the client device 106, where the application is associated with the streaming video platform 100.

In this example, Mark is sharing a streaming video that began a few minutes ago. Users A and B are within Mark's network and begin receiving the streaming video. Cognitive profile information associated with User A indicates that User A lives in Atlanta. Portions of the streaming video showing or discussing Atlanta are accordingly indicated as having relatively high interest correlation values (e.g., "anchor points"), and displayed first (as a "highlight reel") on display 304 prior to display of a real time point of the streaming video. Similarly, cognitive profile information associated with User B indicates that User B enjoys watching videos regarding artificial intelligence. Portions of the streaming video discussing artificial intelligence are indicated as anchor points or highlight segments, and displayed first on display 306 when User B begins receiving the streaming video.

In accordance with one embodiment of the invention, the duration of a highlight segment/stored portion of the streaming video content can be proportional to a total duration of stored content (e.g., 3 second highlights when 30 seconds of the streaming video content has been stored), determined by a media content tag, based on a relative or threshold value of an interest correlation value, etc. In addition, the streaming video platform 100 may provide a personalized indication or alert (for display on a client device) that streaming video content being displayed is not the current portion of the streaming video content, or that a potentially interesting portion of streaming video content has been detected. In some embodiments, the streaming video content may be displayed beginning with a highlight segment, and continue uninterrupted. In other embodiments, a streaming video processing system 102 may determine 1-N highlight segments of streaming video content for display prior to joining a live portion of the streaming video.

The streaming video processing system 102 can "facilitate" display of stored portions of streaming video content in differing ways. In accordance with one embodiment of the invention, for example, the streaming video processing system 102 transmits one or more highlight segments to a client device 106 for automated display prior to joining the live streaming video. In accordance with other example embodiments, the streaming video processing system 102 transmits the highlight segments to the client device 106 following receipt of acceptance of an offer to view the highlight segments. In accordance with further embodiments, the streaming video processing system 102 transmits the streaming video content, including all stored portions of the streaming video content and the current portion, along with indicia of the highlight segments (e.g., for selection by a user of the client device 106 or an appropriately configured video player of the client device 106).

Figure 4:
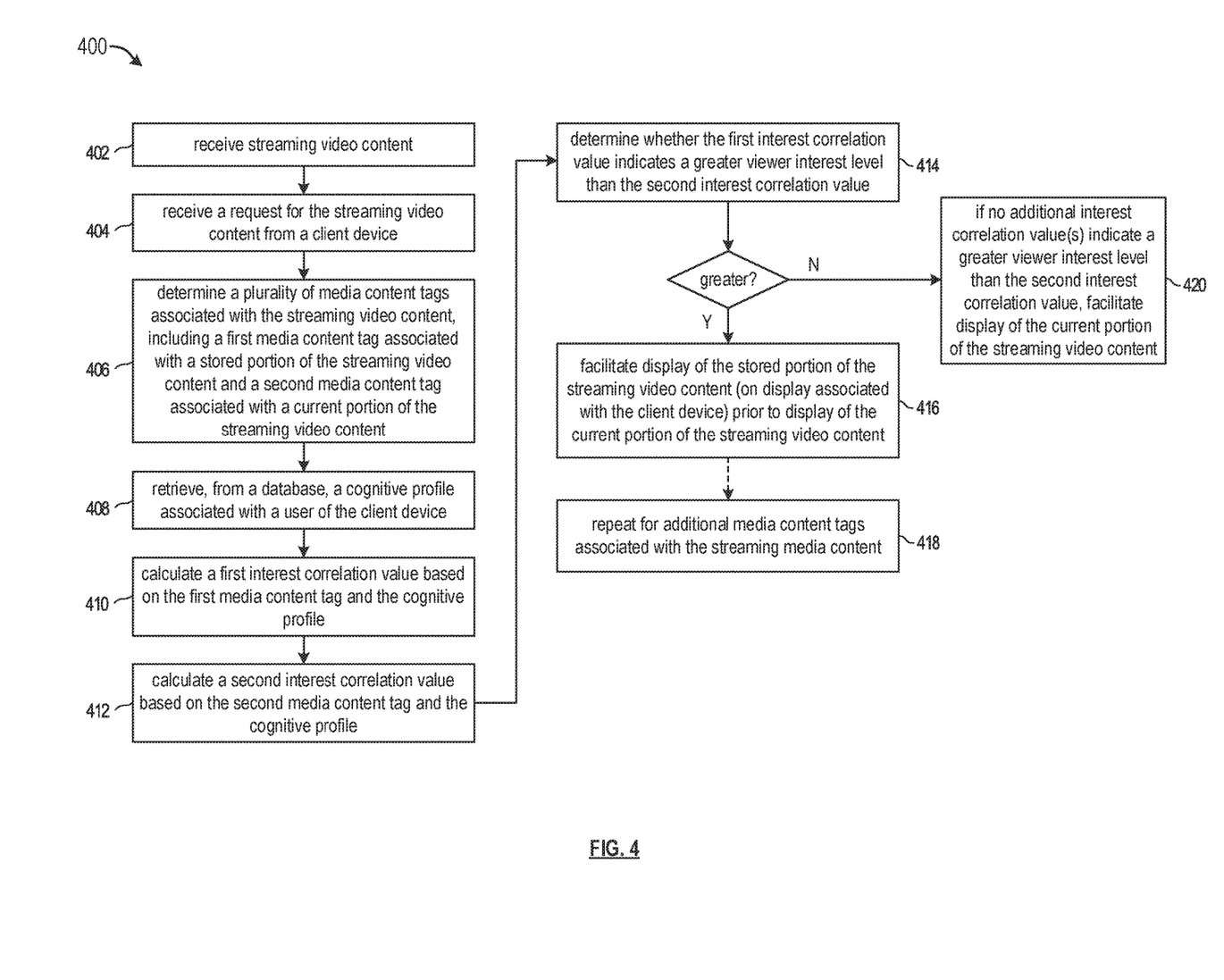
FIG. 4 is a flow diagram illustrating an example of processing streaming video content in accordance with an embodiment of the present disclosure.

FIG. 4 is a flow diagram illustrating an example 400 of processing streaming video content in accordance with an embodiment of the present disclosure. In particular, a method is presented for use in association with one or more functions and features described in conjunction with FIGS. 1-3, for execution by a streaming video processing system 102 that includes a processor, or via another device and/or system of a streaming video processing system, that includes at least one processor and memory that stores instruction that configure the processor or processors to perform the steps described below.

At step 402, the streaming video processing system 102 receives streaming video content. In step 404 a request is received, from a client device 106 of the streaming video processing system 102, for the streaming video content. In response (step 406), a plurality of media content tags associated with the streaming video content are determined by media content tag collection and generation module 112. The plurality of media content tags includes at least a first media content tag associated with a stored portion of the streaming video content, and a second media content tag associated with a current portion of the streaming video content. The plurality of media content tags may include, for example, one or more of a tag generated by a creator of the streaming video content, a tag created by a visual recognition process, a tag created by a facial recognition process, a tag created by an audio recognition process, a tag created by a natural language classification process, a tag created by a chatbot translation process, or a tag created by a video frame profiling process.

In step 408, the streaming video processing system 102 retrieves, from a cognitive profile database 104, a cognitive profile associated with a user of the client device 106 (e.g., as identified explicitly or implicitly by a request received from a user device). Next, in step 410, the interest correlation module 126 of the streaming video processing system 102 calculates a first interest correlation value based on the first media content tag and the cognitive profile. Similarly, at step 412, the interest correlation module 126 calculates a second interest correlation value based on the second media content tag and the cognitive profile.

Step 414 includes determining, by the streaming video processing system 102, whether the first interest correlation value indicates a greater viewer interest level than the second interest correlation value. The determination may be based on a direct comparison of the interest correlation values, one or more interest threshold levels, etc. If the first interest correlation value indicates a greater viewer interest level than the second interest correlation value, at step 416 the streaming video processing system 102 facilitates display of the stored portion of the streaming video content (e.g., on a display integral with or associated with the client device 106) prior to the display of a current portion of the streaming video content. As described more fully below in conjunction with the example of FIG. 5, one or more of the preceding steps can be repeated (at step 418) for additional media content tags associated with the streaming media content.

If the first interest correlation value does not indicate a greater viewer interest level than the second interest correlation value, and there are no additional correlation values associated with the streaming video content that indicate a greater viewer interest level than the second correlation value, at step 420 the streaming video processing system 102/display scheduling module 128 facilitates display of the current portion of the streaming video content.

Figure 5:
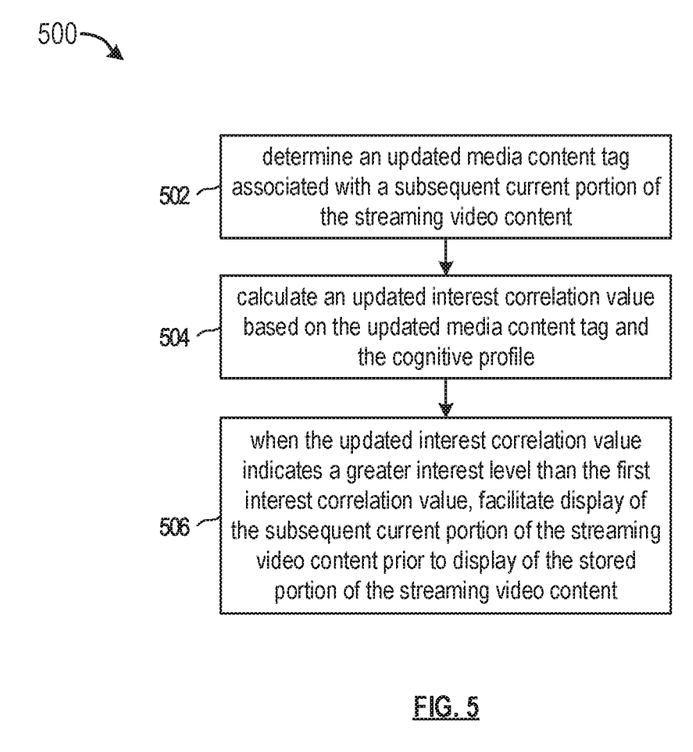
FIG. 5 is a flow diagram illustrating another example of processing streaming video content in accordance with an embodiment of the present disclosure.

FIG. 5 is a flow diagram illustrating another example 500 of processing streaming video content, including determining an updated estimate of likely viewer interest in a then current portion of the streaming video content. In particular, a method is presented for use in association with one or more functions and features described in conjunction with FIGS. 1-4, for execution by a streaming video processing system 102 that includes a processor, or via another device and/or system of a streaming video processing system, that includes at least one processor and memory that stores instruction that configure the processor or processors to perform the steps described below.

Step 502 includes determining, by a media content tag collection and generation module 112, an updated media content tag associated with a subsequent current portion of the streaming video content. Updating the media content tag may include, for example, performing a real-time video frame profiling process, receiving a new media content tag from the source of the streaming video content, etc. Next, in step 504, the interest correlation module 126 of the streaming video processing system 102 calculates an updated interest correlation value based on the updated media content tag and the cognitive profile. At step 506, when the updated interest correlation value indicates a greater interest level than the first interest correlation value (and, optionally, any other interest correlation values previously calculated for unviewed portions of the streaming video content), the streaming video processing system 102/display scheduling module 128 facilitates display of the subsequent current portion of the streaming video content prior to display of the stored portion of the streaming video content.

Figure 6:
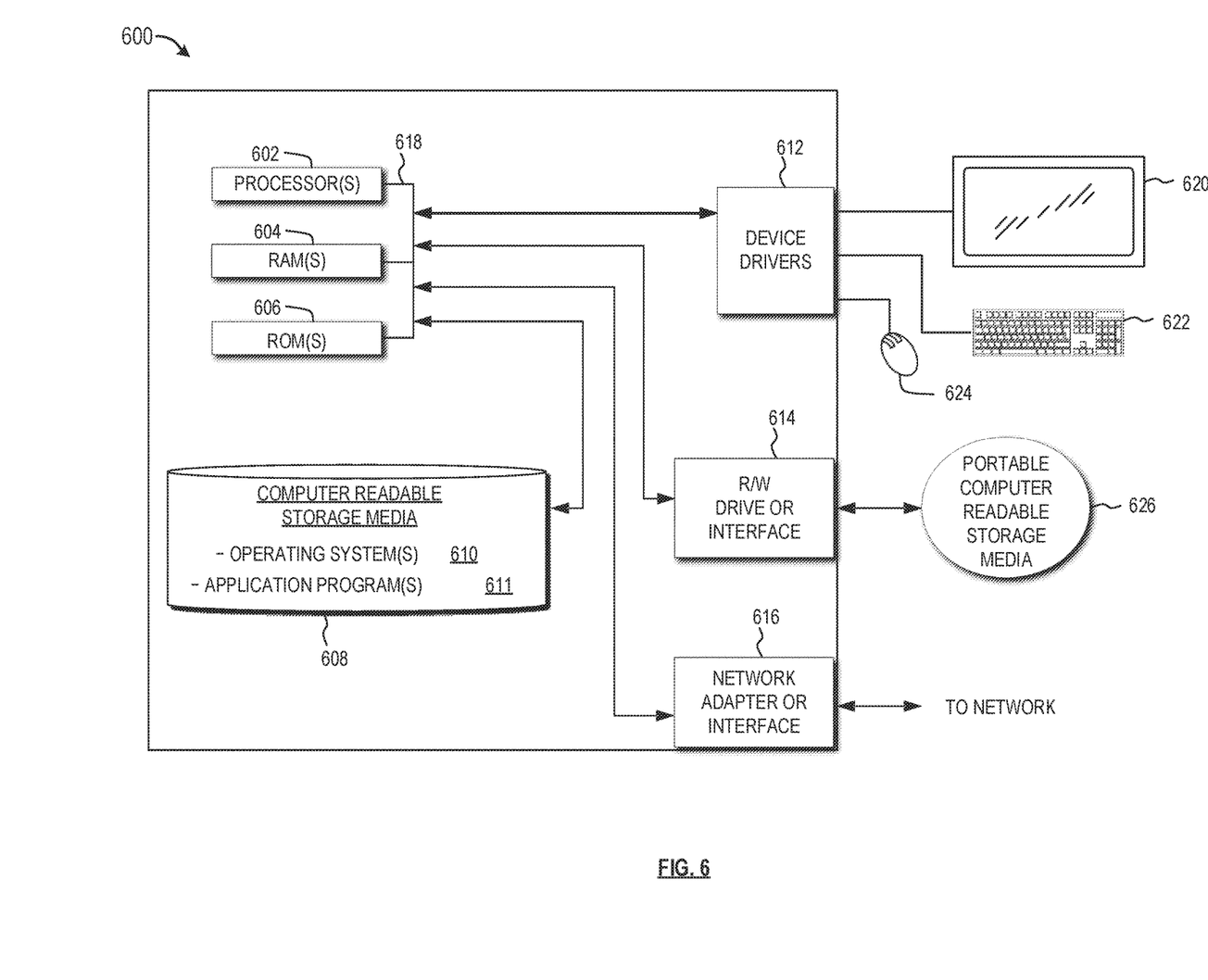
FIG. 6 depicts a block diagram of a computing device according to various embodiments of the present disclosure.

FIG. 6 depicts a block diagram of components of a computing device 600, which can be utilized to implement some or all of the cloud computing nodes 10, some or all of the computing devices 54A-N of FIG. 7, and/or to implement other computing devices/servers described herein in accordance with an embodiment of the present invention. It should be appreciated that FIG. 6 provides only an illustration of one implementation and does not imply any limitations with regards to the environments in which different embodiments may be implemented. Many modifications to the depicted environment may be made.

Computing device 600 can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610 and/or application programs 611, such as network application server software 67 and database software 68, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 600 can also include a R/W drive or interface 614 to read from and write to one or more portable computer readable storage media 626. Application programs 611 on computing devices 600 can be stored on one or more of the portable computer readable storage media 626, read via the respective R/W drive or interface 614 and loaded into the respective computer readable storage media 608.

Computing device 600 can also include a network adapter or interface 616, such as a TCP/IP adapter card or wireless communication adapter. Application programs 611 on computing devices 54A-N can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

Computing device 600 can also include (or otherwise be associated with) a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

FIG. 7 presents an illustrative cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, a set of functional abstraction layers provided by cloud computing environment 50 of FIG. 7 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In some embodiments, one or more hardware components can be implemented by utilizing the computing device 600 of FIG. 6.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized.

Examples of workloads and functions which may be provided from this layer include: mapping and navigation 91; software development and lifecycle management 92; virtual classroom education delivery 93; data analytics processing 94; transaction processing 95; and streaming video processing 96, such as described above.

In various embodiments described above, portions of streaming video content which are of likely interest to a recipient are prioritized for display before a current portion. A client device request is received for available streaming video content for presentation on a display associated with the client device. A plurality of media content tags associated with the streaming video content are determined, the plurality of media content tags including a first media content tag associated with a stored portion of the streaming video content and a second media content tag associated with a current portion of the streaming video content. A cognitive profile associated with a user of the client device is retrieved from a database. Based on the first media content tag and the cognitive profile, a first interest correlation value is calculated (additional such interest correlation values may also be calculated). In addition, based on the second media content tag and the cognitive profile, a second interest correlation value is calculated. When the first interest correlation value indicates a greater interest level than the second interest correlation value, display of the stored portion of the streaming video content on the display device is prioritized over the display of the current portion of the streaming video content. Display of a current portion may subsequently be prioritized based on an updated interest correlation value.

As may be used herein, the term "substantially" provides an industry-accepted tolerance for its corresponding term and/or relativity between items. Such an industry-accepted tolerance ranges from less than one percent to fifty percent. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagrams, can be implemented by special purpose hardware-based systems that perform the specified functions or acts or carry out combinations of special purpose hardware and computer instructions.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be one or more tangible devices that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of a streaming video processing system, the method comprises:
   receiving streaming video content;
   storing the streaming video content, including storing at least a first stored portion of the streaming video content that precedes a current portion of the received streaming video content;
   receiving, from a client device, a request for the streaming video content for display on a display device associated with the client device;
   determining a plurality of media content tags associated with the streaming video content, the plurality of media content tags including, at least, a first media content tag associated with the first stored portion of the streaming video content and a second media content tag associated with the current portion of the streaming video content;
   retrieving, from a database, a cognitive profile associated with a user of the client device;
   calculating, for the first stored portion of the streaming video content, a first interest correlation value based on the first media content tag and the cognitive profile;
   calculating, for the current portion of the streaming video content, a second interest correlation value based on the second media content tag and the cognitive profile;
   determining whether the first interest correlation value indicates a greater interest level than the second interest correlation value; and
   in response to determining that the first interest correlation value indicates a greater interest level than the second interest correlation value, facilitating display of the first stored portion of the streaming video content on the display device prior to display of the current portion of the streaming video content.

2. The method of claim 1, wherein the plurality of media content tags further includes a third media content tag associated with a second stored portion of the streaming video content, the method further comprises:
   calculating a third interest correlation value based on the third media content tag and the cognitive profile;
   determining whether the third interest correlation value indicates a greater interest level than the second interest correlation value;
   in response to determining that the third interest correlation value indicates a greater interest level than the second interest correlation value, facilitating display of the second stored portion of the streaming video content on the display device prior to display of the current portion of the streaming video content; and
   in response to determining that the third interest correlation value indicates a lesser interest level than the second interest correlation value, facilitating display of the current portion of the streaming video content on the display device.

3. The method of claim 1 further comprises:
   determining an updated media content tag associated with a subsequent current portion of the streaming video content;
   calculating an additional interest correlation value based on the updated media content tag and the cognitive profile;
   determining whether the additional interest correlation value indicates a greater interest level than the first interest correlation value; and
   in response to determining that the additional interest correlation value indicates a greater interest level than the first interest correlation value, prioritizing display of the subsequent current portion of the streaming video content on the display device prior to completion of the display of the first stored portion of the streaming video content.

4. The method of claim 1, wherein a duration of the first stored portion of the streaming video content is determined based, at least in part, on the first interest correlation value.

5. The method of claim 1, wherein a duration of the first stored portion of the streaming video content is proportional to a total duration of the streaming video content.

6. The method of claim 1, wherein facilitating display of the first stored portion of the streaming video content on the display device includes facilitating display of an option to display the first stored portion of the streaming video content.

7. The method of claim 1, wherein facilitating display of the first stored portion of the streaming video content on the display device includes facilitating display of an indication that the streaming video content being displayed is not the current portion of the streaming video content.

8. The method of claim 1, wherein the plurality of media content tags includes at least one of a tag generated by a creator of the streaming video content, a tag created by a visual recognition process, a tag created by a facial recognition process, a tag created by an audio recognition process, a tag created by a natural language classification process, a tag created by a chatbot translation process, or a tag created by a video frame profiling process.

9. The method of claim 1, wherein the cognitive profile includes at least one of demographic information, social media activity related information, or browsing history information.

10. A computer program product comprising a computer readable storage medium having program instructions embodied therewith, the program instructions executable by one or more processing modules to cause the one or more processing modules to:
   receive streaming video content;
   store the received streaming video content, including storing at least a first stored portion of the streaming video content that precedes a current portion of the streaming video content;
   receive, from a client device, a request for the streaming video content for display on a display device associated with the client device;
   determine a plurality of media content tags associated with the streaming video content, the plurality of media content tags including, at least, a first media content tag associated with the first stored portion of the streaming video content and a second media content tag associated with a current portion of the streaming video content;

retrieve, from a database, a cognitive profile associated with a user of the client device;

calculate, for the first stored portion of the streaming video content, a first interest correlation value based on the first media content tag and the cognitive profile;

calculate, for the current portion of the streaming video content, a second interest correlation value based on the second media content tag and the cognitive profile;

determining whether the first interest correlation value indicates a greater interest level than the second interest correlation value; and in response to determining that the first interest correlation value indicates a greater interest level than the second interest correlation value, facilitate display of the first stored portion of the streaming video content on the display device prior to display of the current portion of the streaming video content.

11. The computer program product of claim 10, wherein the plurality of media content tags further includes a third media content tag associated with a second stored portion of the streaming video content, the program instructions further executable to cause the one or more processing modules to:

calculate a third interest correlation value based on the third media content tag and the cognitive profile;

determining whether the third interest correlation value indicates a greater interest level than the second interest correlation value;

in response to determining that the third interest correlation value indicates a greater interest level than the second interest correlation value, facilitate display of the second stored portion of the streaming video content on the display device prior to display of the current portion of the streaming video content; and in response to determining that the third interest correlation value indicates a lesser interest level than the second interest correlation value, facilitate display of the current portion of the streaming video content on the display device.

12. The computer program product of claim 10, the program instructions further executable to cause the one or more processing modules to:

determine an updated media content tag associated with a subsequent current portion of the streaming video content;

calculate an additional interest correlation value based on the updated media content tag and the cognitive profile;

determining whether the additional interest correlation value indicates a greater interest level than the first interest correlation value; and in response to determining that the additional interest correlation value indicates a greater interest level than the first interest correlation value, prioritize display of the subsequent current portion of the streaming video content on the display device prior to completion of the display of the first stored portion of the streaming video content.

13. The computer program product of claim 10, wherein a duration of the first stored portion of the streaming video content is determined based, at least in part, on the first interest correlation value.

14. The computer program product of claim 10, wherein a duration of the first stored portion of the streaming video content is proportional to a total duration of the streaming video content.

15. The computer program product of claim 10, wherein facilitating display of the first stored portion of the streaming video content on the display device includes facilitating display of an option to display the first stored portion of the streaming video content.

16. A computing device comprises:

a network interface;

a memory comprising instructions; and processing circuitry in communication with the memory, wherein the processing circuitry executes the instructions to:

receive, via the network interface, streaming video content;

store the received streaming video content, including storing at least a first stored portion of the streaming video content that precedes a current portion of the streaming video content;

receive a request for the streaming video content for display on a display device associated with a client device;

determine a plurality of media content tags associated with the streaming video content, the plurality of media content tags including, at least, a first media content tag associated with the first stored portion of the streaming video content and a second media content tag associated with a current portion of the streaming video content;

retrieve, from a database, a cognitive profile associated with a user of the client device;

calculate, for the first stored portion of the streaming video content, a first interest correlation value based on the first media content tag and the cognitive profile;

calculate, for the current portion of the streaming video content, a second interest correlation value based on the second media content tag and the cognitive profile;

determining whether the first interest correlation value indicates a greater interest level than the second interest correlation value; and in response to determining that the first interest correlation value indicates a greater interest level than the second interest correlation value, facilitate display of the first stored portion of the streaming video content on the display device prior to display of the current portion of the streaming video content.

17. The computing device of claim 16, wherein the plurality of media content tags further includes a third media content tag associated with a second stored portion of the streaming video content, the processing circuitry further executes the instructions to:

calculate a third interest correlation value based on the third media content tag and the cognitive profile;

determining whether the third interest correlation value indicates a greater interest level than the second interest correlation value;

in response to determining that the third interest correlation value indicates a greater interest level than the second interest correlation value, facilitate display of the second stored portion of the streaming video content on the display device prior to display of the current portion of the streaming video content; and in response to determining that the third interest correlation value indicates a lesser interest level than the second interest correlation value, facilitate display of the current portion of the streaming video content on the display device.

18. The computing device of claim 16, wherein the processing circuitry further executes the instructions to:
determine an updated media content tag associated with a subsequent current portion of the streaming video content;
calculate an additional interest correlation value based on the updated media content tag and the cognitive profile;
determining whether the additional interest correlation value indicates a greater interest level than the first interest correlation value; and
in response to determining that the additional interest correlation value indicates a greater interest level than the first interest correlation value, prioritize display of the subsequent current portion of the streaming video content on the display device prior to completion of the display of the first stored portion of the streaming video content.

19. The computing device of claim 16, wherein a duration of the first stored portion of the streaming video content is determined based, at least in part, on the first interest correlation value.

20. The computing device of claim 16, wherein a duration of the first stored portion of the streaming video content is proportional to a total duration of the streaming video content.

* * * * *